US012804228B2

(12) United States Patent
Schmidt et al.

(10) Patent No.: US 12,804,228 B2
(45) **Date of Patent: *Nov. 17, 2026**

(54) SYSTEM AND METHOD FOR DISPLAYING A STREAM OF IMAGES

(71) Applicant: Apple Inc., Cupertino, CA (US)

(72) Inventors: Eberhard Schmidt, Kleinmachnow (DE); Tom Sengelaub, Berlin (DE); Christian Villwock, Grossbeeren (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/263,867

(22) Filed: Jul. 9, 2025

(65) Prior Publication Data

US 2025/0337983 A1 Oct. 30, 2025

Related U.S. Application Data

(63) Continuation of application No. 18/214,752, filed on Jun. 27, 2023, now Pat. No. 12,382,134, which is a (Continued)

(30) Foreign Application Priority Data

Aug. 7, 2015 (EP) .................................... 15180286

(51) Int. Cl.
*H04N 21/442* (2011.01)
*G02B 27/00* (2006.01)
(Continued)

(52) U.S. Cl.
CPC ... *H04N 21/44218* (2013.01); *G02B 27/0093* (2013.01); *G06F 3/013* (2013.01);
(Continued)

(58) Field of Classification Search
None
See application file for complete search history.

(56) References Cited

U.S. PATENT DOCUMENTS 5,644,324 A 7/1997 Maguire, Jr.
5,717,413 A 2/1998 Mizouchi
(Continued)

FOREIGN PATENT DOCUMENTS

CN 101861118 A 10/2010
CN 101984464 A 3/2011
(Continued)

OTHER PUBLICATIONS

International Search Report for corresponding PCT/EP2016/068821 dated Oct. 10, 2016.

(Continued)

*Primary Examiner* — James R Marandi
(74) *Attorney, Agent, or Firm* — Fernando & Partners, LLP

(57) ABSTRACT

Method for subsequently displaying a stream of images in a display area of a display device, wherein a first area within the display area is determined around a point of regard. A first image of the stream of images is displayed in the display area such that a first part of the first image, which is displayed in the first area, is displayed according to a first parameter value of at least one parameter and a second part of the first image, which is displayed in at least one second area outside the first area, is displayed according to a second parameter value of the at least one parameter. Moreover, the determining of the point of regard is performed as predicting the point of regard for a certain future point of time, at which the first image is displayed.

20 Claims, 6 Drawing Sheets

Figure 1:
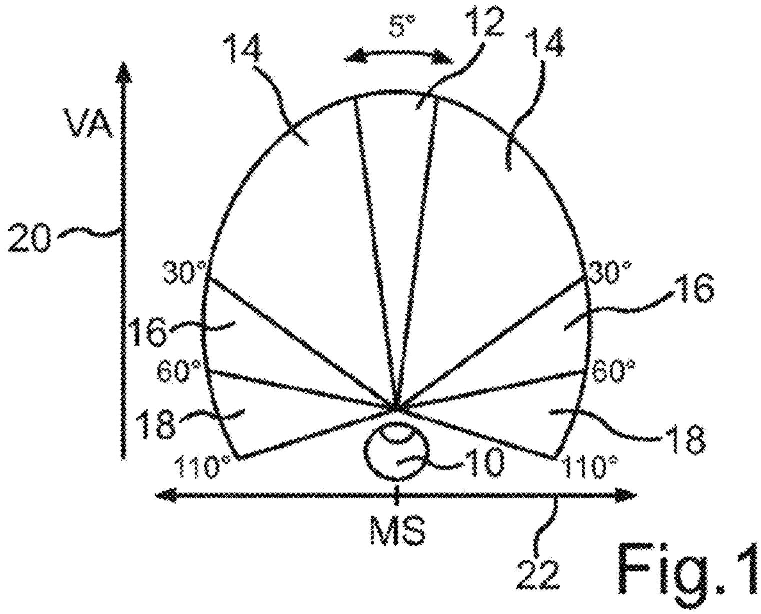

Related U.S. Application Data continuation of application No. 17/497,435, filed on Oct. 8, 2021, now Pat. No. 11,729,463, which is a continuation of application No. 15/750,046, filed as application No. PCT/EP2016/068821 on Aug. 5, 2016.

(51) Int. Cl.

| | |
|---|---|
| ***G06F 3/01*** | (2006.01) |
| ***H04N 21/4223*** | (2011.01) |
| ***H04N 21/431*** | (2011.01) |
| ***H04N 21/44*** | (2011.01) |
| ***H04N 21/4728*** | (2011.01) |

(52) U.S. Cl.

CPC ..... *H04N 21/4223* (2013.01); *H04N 21/4318* (2013.01); *H04N 21/44008* (2013.01); *H04N 21/4728* (2013.01)

(56) References Cited

U.S. PATENT DOCUMENTS

| | | | | |
|---|---|---|---|---|
| 5,726,916 | A | 3/1998 | Smyth | |
| 6,252,989 | B1 | 6/2001 | Geisler et al. | |
| 8,696,121 | B1 | 4/2014 | Fram | |
| 9,239,956 | B2 | 1/2016 | Hein | |
| 2005/0018911 | A1 | 1/2005 | Deever | |
| 2010/0033333 | A1 | 2/2010 | Victor et al. | |
| 2010/0054526 | A1 | 3/2010 | Eckles | |
| 2010/0110069 | A1 | 5/2010 | Yuan | |
| 2011/0298936 | A1 | 12/2011 | Watanabe | |
| 2013/0250087 | A1 | 9/2013 | Smith | |
| 2014/0176591 | A1 | 6/2014 | Kelin et al. | |
| 2014/0361977 | A1 | 12/2014 | Stafford et al. | |
| 2015/0277552 | A1 | 10/2015 | Wilairat | |
| 2016/0260196 | A1* | 9/2016 | Roimela | G06F 3/013 |
| 2016/0360267 | A1 | 12/2016 | Marilly | |

FOREIGN PATENT DOCUMENTS

| | | | |
|---|---|---|---|
| CN | 102006456 | A | 4/2011 |
| EP | 1056049 | A2 | 11/2000 |
| KR | 1020120027507 | A | 3/2012 |
| WO | WO2014103732 | A1 | 7/2014 |
| WO | WO2015030949 | | 3/2015 |

OTHER PUBLICATIONS

English Translation of Office Action for Korean Application 10-2018-7003096 dated Dec. 18, 2018.

Qin Cheng et al., "Gaze Location Prediction for Broadcast Football Video," IEEE Transactions on Image Processing, vol. 22, No. 12, Dec. 2013, pp. 4918-4929.

Parag K. Mital et al., "Clustering of Gaze During Dynamic Scene Viewing is Predicted by Motion," Cogn. Comput., vol. 3, 2011, pp. 5-24.

Office Action for corresponding Chinese Appl. No. 201680043398.4 dated Nov. 2, 2021 (27 pages).

Oleg V. Komogortsev et al., "Predictive real-time perceptual compression based on eye-gaze-position analysis." ACM Transactions on Multimedia Computing, Communications, and Applications (TOMM) 4.3 (2008): 1-16.

Extended European Search Report dated Sep. 30, 2022, European Application No. 22182946.8, pp. 1-24.

Partial Search Report for corresponding EP Appl. No. 26151455.8 dated Mar. 10, 2026, 14 pages.

Office Action for corresponding Chinese Appl. No. 202310331471.X dated Jun. 13, 2026 (English translation).

* cited by examiner

SYSTEM AND METHOD FOR DISPLAYING A STREAM OF IMAGES

CROSS-REFERENCE TO RELATED APPLICATIONS

This application is a continuation of U.S. patent application Ser. No. 18/214,752, filed on Jun. 27, 2023, which is a continuation of U.S. patent application Ser. No. 17/497,435, filed on Oct. 8, 2021, which is a continuation of U.S. patent application Ser. No. 15/750,046, filed on Feb. 2, 2018, which is the national phase entry of Intl. Patent App. No. PCT/EP2016/068821, filed on Aug. 5, 2016, which claims priority to European Patent App. Nos. 15180286.5, filed on Aug. 7, 2015, which are all hereby incorporated by reference in their entirety.

DESCRIPTION

The invention relates to a system and method for subsequently displaying a stream of images in a display area of a display device, wherein a point of regard of a user looking at the display area is determined and a first area within the display area around the determined point of regard is determined. Moreover, a first image of the stream of images is displayed in the display area such that a first part of the first image, which is displayed in the first area, is displayed according to a first parameter value of at least one parameter, which is correlated with an image characteristic of the first image, and a second part of the first image, which is displayed in at least one second area outside the first area, is displayed according to a second parameter value of the at least one parameter.

In the field of computer-generated graphics it is known to create images by rendering a scene provided in the form of scene data. A scene may include a virtual 2D or 3D model with objects, geometry, viewpoint, texture, lighting, and shading information as a description of the virtual scene. The rendered scene can then be presented as an image. It is also known from the prior art to do so-called foveated rendering, wherein a point of regard of a user or an area of interest is determined and a scene is rendered with high resolution around this point of regard and with lower resolution elsewhere. Here the resolution would be an example of above-named at least one parameter, the value of which determines an image characteristic. The so rendered scene is then displayed with a next update of the display.

Due to latency times, like the time that is needed for calculating the point of regard and especially the time for rendering a scene it can happen that by the time the display is updated the user is looking somewhere else and this area, or part of it, is not correctly rendered, e.g. with enough detail, as the gaze has moved away from the original calculated point of regard.

Therefore, it is an object of the present invention to provide a system and method for displaying a stream of images which can provide an improvement with regard to the displaying of areas with different image characteristics in dependency of the point of regard.

This object is solved by a system and method with the features according to the independent claims. Advantageous embodiments of the invention are presented in the dependent claims.

According to a first aspect of the invention the method for subsequently displaying a stream of images in a display area of a display device comprises:

a) determining a point of regard of a user looking at the display area;

b) determining a first area within the display area around the determined point of regard;

c) displaying a first image of the stream of images in a display area such that a first part of the first image, which is displayed in the first area, is displayed according to a first parameter value of at least one parameter, which is correlated with an image characteristic of the first image, and a second part of the first image, which is displayed in at least one second area outside the first area, is displayed according to a second parameter value of the at least one parameter.

Moreover, in a) the determining of the point of regard is performed as predicting the point of regard for a certain future point of time, at which the first image is displayed, in dependency of at least one result of at least one image related analysis.

Advantageously, by means of predicting the point of regard a forecast can be made with regard to the position of the point of regard for the certain point in of time, at which the first image is displayed. This way it can be achieved that the first area, which is determined in dependency of the predicted point of regard, with higher probability fits an area around the actual point of regard at the time the first image is displayed.

Such a prediction of the point of regard cannot only be used with regard to rendered computer graphics but also with regard to not computer-generated images, like video recordings. However, the advantages can be achieved especially with regard to computer-generated graphics, which need a lot of time for rendering a scene. There are estimations of the time available to update the screen, when the eye moves to a different position, is less than 4 ms, when it should be unrecognizable to the user. Therefore, the gaze prediction or prediction of the point of regard is advantageously looking ahead in time to gain more time for rendering a screen update of the target to be gazed at.

The at least one parameter, which is correlated with an image characteristic of the first image, may relate to a resolution. For example in the first area the image can be displayed with higher resolution and in at least one second area the image can be displayed with lower resolution. Additionally or alternatively, the at least one parameter can also relate to a brightness, a color saturation, or especially with regard to computer-generated graphics a level of detail. So for example areas concentric around a predicted point of regard, or also called foveated point, can be rendered with decreasing resolution in direction outwards from the point of regard. Also peripheral areas of the at least one first image, like the at least one second area, can be reduced in additional dimensions, which means besides resolution, like color, motion, e.g. anti-aliasing, application of shaders, complexity, calculation of light, texture, number of polygons and so on. It can also be considered to re-use previously rendered images or to render only half the background and mirror the rendered background. Also information from previous frames in the periphery can be reused like warping images from the previous frame according to new position and an orientation and only render or refresh the foveated, namely the first area around the predicted point of regard, or only performing a partial warp. So by all these parameters different image characteristics within the first area and outside the first area can be provided, especially such that the image is presented in the first area with much higher quality, level of detail, and so on, and lots of computing time can be saved or also power as the part of the image outside the first area is displayed with lower quality, less detail, less resolution, or not at all.

Moreover, when predicting the point of regard, not only one single point of regard can be predicted but at least one point of regard is predicted, e.g. also several points of regard can be predicted as possible candidates for the final point of regard, for example with respective probabilities for finally matching the real point of regard at the certain future point in time. This can be done especially when taking into account image content of one or more of the stream of images, especially also future image content like image content of the first image to be displayed, and which is explained later in more detail. Therefore also several first areas can be determined, e.g. one for each predicted point of regard or for each possible candidate for the final point of regard. These several first areas may overlap or can be spatially separated as well, e.g. each having one of the predicted points of regard in the center of the respective first area. Moreover, additionally to performing the prediction of the point of regard for the certain future point in time the current point of regard can be calculated as well, e.g. based on currently captured gaze data, and a second area within the display area around the determined current point of regard is determined. This second area can then be displayed similarly to the first area, i.e. according to the first parameter value of at least one parameter, namely with higher resolution, level of detail, and so on. Depending on the situation, the second area and the first area may overlap, being spatially separated or also identical, depending on the difference in position of the determined current point of regard and the predicted point of regard for the certain future point in time. Therefore, advantageously one can also make use of data one knows for sure or at least with high precision, namely the current point of regard. In case the predicted point of regard for the certain future point in time can only be determined very inaccurately under some circumstances, the second area based on the current point of regard provides a good fallback position.

For predicting the point of regard there are several possibilities, which can also be combined in any arbitrary way. According to the most preferred embodiments of this invention these possibilities include the prediction of the point of regard on the one hand by eye-tracking data analysis, which is based on eye images captured of at least one eye of the user, and on the other hand based on image content of the displayed images or the images to be displayed, like based on saliency points in the scene or in the image and/or based on semantic content of the scene or the image, and which are explained in the following in more detail.

So, according to an advantageous embodiment of the invention the at least one image related analysis relates to an analysis of gaze data captured on the basis of eye images of at least one eye of the user and/or an analysis of an image content of at least one of the stream of images. Gaze pattern as well as image content advantageously provide information about in where, or at least in what region, the user is likely going to look. Preferably the time between the prediction of the point of regard and the certain future point of time, at which the first image is displayed, is in real time or at least available when the rendering of a frame starts. Preferably a refined prediction of the gaze endpoint is also available throughout the rendering process. On the basis of gaze data and/or image content a very reliably forecast of the point of regard is possible at least at time scales considered here, which are in the milliseconds range, like a forecast from 1 to 100 ms in advance of the certain point in time. Usually the image rate is about 90 Hz, so the time for rendering a new image (if rendering of a new image is not started before the previous image is displayed) is about 11 ms. Therefore a prediction of 11 ms at the most would even be enough for determining the point of regard at the certain future point in time.

According to an advantageous embodiment of the invention the predicting of the point of regard comprises d) capturing gaze data of at least one eye of the user;

e) from the captured gaze data determining an eye parameter of the at least one eye;

f) performing d) and e) several times subsequently prior to the certain future point of time; and g) predicting the point of regard of the certain future point of time in dependency of the several times determined eye parameter as the at least one result.

The eye parameter can be for example the gaze direction or the gaze point, like a current point of regard. So advantageously a gaze pattern can be analyzed, especially as the at least one image related analysis, and on the basis of this analysis the point of regard can be predicted for the certain future point of time. Especially, the relevant information of the eye tracking data or the eye data in general, like the gaze data, can be grouped into saccade, especially saccade onset, fixation, and smooth pursuit data. Each of this group allows a different way of prediction of the point of regard.

Therefore, it is an advantageous embodiment of the invention that based on the several determined eye parameters a characteristic eye movement of the at least one eye is determined, wherein the characteristic eye movement is classified to be one of a static fixation, a continuous moving fixation, also called smooth pursuit, or a saccade, or a saccade onset, wherein the point of regard for the certain future point of time is determined in dependency on the determined characteristic eye movement. So in order to differentiate these characteristic eye movements an online event classification can be used, especially various methods can be used to do this. Thereby, the following characteristics and physiological properties of each of the characteristic eye movements can be used.

Fixations are characterized by the point of regard being within a small diameter for a period of time, typically 100 to 500 ms. These parameters can be used to classify fixations online, eye tracker data stream. E.g. one could conclude that when having a fixation detected and a minimum fixation period is not reached, the point of regard will remain the same at least until the minimum fixation time is reached. Therefore, when on the basis of a determined eye parameter a fixation is detected, the current determined point of regard can be taken to be the predicted point of regard. A stable fixation can also be used to determine the peripheral viewing area to control peripheral movement and/or suppression.

A continuous moving fixation or smooth pursuit is similar to a fixation, yet on a moving target. Hence the diameter limitation of the point of regard does not apply anymore.

However, the movement of the point of regard is slow, typically beyond a certain threshold, and smooth. Based on these parameters, smooth pursuit can be classified. Especially, a direction and a final position as the predicted point of regard can be predicted.

Saccades are the fast eye movements between fixations and smooth pursuit. They are ballistic movements of the eye characterized by a speed and acceleration profile, a direction, and an angular amplitude. In particular the ballistic movement is characterized by the initial acceleration of the saccadic eye movement that defines the amplitude and direction and thereby allows to predict the landing point of regard as a function of this initial parameters, which are the parameters of the saccade onset. This landing point can then serve as the predicted point of regard.

Therefore, the detection of such characteristic eye movements, especially in the course of the image related analysis, is very advantageous for predicting the point of regard for the certain future point of time.

So in general the point of regard for the certain future point of time can be determined in dependency on the determined characteristic eye movement such that in dependency on the determined characteristic a characteristic future motion path of the point of regard is calculated and on the basis of the characteristic future motion path the position of the point of regard is determined for the certain future point of time.

According to another advantageous embodiment of the invention the predicting of the point of regard is performed in dependency on image content and/or a context of the image content of the at least one of the stream of images as the at least one result.

This is based on the finding that certain image content, like bright regions or colorful regions, attract the eye, and therefore such content can also be advantageously be derived from image related analysis related to the content of one or more of the stream of images and used to predict the point of regard. Thereby, especially the content of the first image can be used and/or the content of previously or currently displayed images previous to the first image.

Each approach for predicting the point of regard can be used separately or combined with any of the others. Moreover, each of the above prediction methods can predict one or multiple gaze end points, which are preferably associated with an end certainty, which is explained later in more detail.

Also a prediction of a user action can be used to predict the point of regard, e.g. based on gaze and user behavior, and also on history data, statistics of other users, etc., for example to start rendering hidden entities revealed by an action the user is likely to make. Also one can predict the likeliness for this action and therefore determine a detail of the (pre)rendering.

In general the gaze prediction can be performed for any kind of image so that the correct position of the first area can be greatly improved in accuracy. However, according to an advantageous embodiment of the invention each image of the stream of images is a computer-generated graphic generated by rendering at least one scene. Especially with the regard to computer-generated graphics long latency times occur for rendering the respective scenes to be shown in the respective images. So due to the prediction of the gaze point, namely the point of regard, great advantages can be achieved.

According to another advantageous embodiment of the invention for predicting the point of regard in dependency on image content, the scene presented or to be presented in at least one of the images is analyzed, especially in the course of the image related analysis, with regard to an existence of defined saliency points, especially which are points which comprise a corner and/or an edge of an object in the scene, or at least part thereof, and or at least one predefined alarm color, and or a color change between subsequent images, and/or bursts, and/or motion, especially an object in the scene, which moves, i.e. changes its position with regard to at least two subsequent images, in particular with respect to at least another object in the scene.

Moreover, if at least one of the saliency points is found and is visible in the at least one of the images presenting the scene when displayed, the point of regard is predicted for the certain future point of time in dependency on the at least one found saliency point. This point of regard prediction using saliency points makes use of the key attention capturing properties of a scene: This is based on a finding that fixations of the human eye need an edge in the scene that is looked at. Similarly, color changes, bursts, motion, certain alarm colors, like red or bright white attract the human eye. Especially, preprocessing of an image can be used to define a saliency map or determine edges or other saliency points in the direction of the most likely eye movement and thereby find areas of interest in the upcoming scene that will likely attract the nearest point of regard. So for example the image, before it is displayed, can be analyzed whether there are any saliency points in the scene that is presented by the first image. Optionally additionally gaze data can be used to predict the point of regard. If then saliency points are found in the first image, which lie near the predicted point of regard or even also the current point of regard, it can be assumed that the actual point of regard at the time the first image is displayed will lie on such a saliency point. Further saccadic movements or saccadic onsets can be used to select possible endpoints by considering saliency points which lay within the direction and/or reach of the saccade. Further statistical and history data as well as classifiers trained e.g. using machine learning can be used to select or rate possible gaze endpoints. Therefore, advantageously such saliency points or in general image content can be used to more accurately predict the final point of regard. However, not only the content of the first image can be taken into account but also the content of previous or future images, for example to be able to determine changes, like color changes or movement, which might attract the eye or which will be followed by the eye.

According to another advantageous embodiment of the invention for predicting the point of regard in dependency on the context of the image content, at least one semantic information of the scene is derived, especially wherein the semantic information comprises information about the meaning of objects and/or behavior of objects for causing attraction of the user's at least one eye. For example, if an image is displayed, especially previous to the first image, in which a person is shown who points with his finger in a certain direction, then likely the user will not look at the pointing finger but instead in the direction the finger is pointing, or onto an object on which the finger is pointing. So as prediction for the point of regard it can be assumed that the user will look at this object when the next image, like the first image, is displayed. The same applies for example for a person shown in an image, which looks in a certain direction, then probably the user will not keep looking at that person but instead in the direction this person is looking, e.g. on an object lying in that direction. Therefore, the look of such a person has a higher chance of attracting visual attention by the user, even if the corresponding target is not in the scene yet. Also if a moving object appears in the peripheral view of a user, this object has a higher chance of attracting visual attention than others, further elevated by parameters like size, color, and contrast to the environment. So the point of regard prediction based on semantic content can be seen as a combination of the saliency attraction with the knowledge of semantic content in artificially created scenes or scenes that have been semantically coded.

Moreover, the semantic information of the scene is derived with regard to the first image and/or with regard to an image displayed previous to the displaying of the first image.

According to another advantageous embodiment of the invention for predicting the point of regard in dependency of the at least one result of the analysis of the image content and of the analysis of the gaze data, one or more possible candidates for the final predicted point of regard are defined on the basis of the image content, wherein to each of the one or more candidates a probability for the actual point of regard to the user at the certain future point in time matching the respective candidate is assigned constituting a probability map, wherein the probabilities of the probability map are modified at least once in dependency of the analysis of the gaze data and/or image content. So for predicting the point of regard advantageously both can be used, image content as well as gaze data, to facilitate a prediction with high precision. For example, if the first image will comprise ten saliency points, like corners or edges as explained above, one can start with assigning the same probability to each of these saliency point, so that for each of these saliency point, which then denote the candidates, the probability that the user will look at one of them is ten percent. When using additional gaze data one can advantageously modify the probabilities accordingly. If e.g. the start of a saccade is detected, which has a direction pointing to the right, then the final point of regard will lie on the right hand side of the current point of regard. Therefore the probabilities for all candidates lying on the left hand side of the current point of regard can be modified to be zero, whereas the probabilities for the other candidates on the right hand side can be rated higher. So advantageously the predicting of the point of regard can be performed in dependency of the image content, where it is analyzed, and the probability map for possible gaze endpoints, which are the above named candidates, is created based on that. Eye features can then be used to exclude possible endpoint candidates and also to upvote others.

According to another advantageous embodiment of the invention on the basis of the gaze data a prognosticated point of regard for the certain future point in time is determined, and the probability map is modified in dependency of a difference between a position of the prognosticated point of regard and a position of the respective candidate. E.g. candidates lying closer to the prognosticated point of regard, which is calculated on the basis of the captured gaze data, can be rated with a higher probability than those lying farer away from the prognosticated point of regard. Moreover, the probability map can be modified more than once, e.g. each time new gaze data are captured before reaching the certain future point in time, these new gaze data can be used to refined the calculated prognosticated point of regard and to modify the probability map accordingly. The first prognosticated point of regard can be seen as a first assessment of the point of regard to be predicted and can be predicted on the basis of gaze data as explained above with regard to the prediction of the point of regard for the certain future point in time in dependency of the gaze data. However, in this case, the prognosticated point of regard is not equal to the point of regard to be predicted, but is used to refine the probability map, on the basis of which finally the point of regard for the certain future point in time is determined, e.g. like described in the following.

According to another advantageous embodiment of the invention the candidate with the highest probability of the modified probability map, especially the latest modified probability map, if the map is modified more than once, is determined to be the predicted point of regard for the certain future point in time and/or the first area is determined such that all of the candidates comprising a probability higher than a predefined threshold are within the first area. Also, as mentioned above, each candidate can be seen as a predicted point of regard, so by having several possible candidates several point of regard for the certain future point in time can be determined, and moreover for each candidate a respective first area can be determined. The image quality, namely resolution, detail, etc. may be the same in each first area or vary e.g. depending on the probability for the respective candidate, wherein areas relating to candidates with assigned high probability can be rendered or displayed in the first image with higher quality than areas relating to candidates with assigned lower probability. The first areas may overlap or be spatially separated. So advantageously it can be ensured that with very high probability the actual point of regard at the certain future point in time will be within the first area. Therefore it is very advantageous to use multiple gaze end points and use the probability for corresponding rendering.

According to another advantageous embodiment of the invention the probability map is constituted and/or modified in dependency of a result of an analysis of gaze data of at least one second user, who has looked at least one of the stream of images before, especially including the first image. So advantageously statistics of other users can be used, especially additionally or also alternatively, to modify the probability map. If e.g. one or more additional second users have watched the stream of images before, and most of them have looked at one certain candidate of above named candidates, then this certain candidate can be evaluated with a higher probability than the others. So also user statistics can be used to up vote and down vote the possible gaze endpoints.

According to another advantageous embodiment of the invention the image content at least relates to the first image. Especially with regard to computer generated graphics the image content relating to a certain scene is known to the system and advantageously therefore the future image content can be used for prediction, especially to limit and/or converge the probability map. However, also the image content of the currently displayed image can be used alternatively or additionally, or also that of previously shown images, as also on the basis of already or currently displayed images possible candidates can be determined for the future, like e.g. explained above with regard to context or semantic information.

According to another advantageous embodiment of the invention in b) a size and a shape of the first area is dynamically determined in dependency on at least one first adjustment parameter, especially which affects a perception of the first image by the user. An adjustment parameter, which affects a perception of the first images by the user shall be understood such that such a parameter affects the quality of perception, especially so that when adapting the first area to a certain value of such adjustment parameter, the first area will better match with the foveal region of the eye of the user. This has the great advantage that the size or shape of the area can be adapted to many different situations, like different users, different system performances, different latency times, and so on. On the one hand, making the first area as small as possible is advantageous for saving power or computation time, as only a small part of the image has to be shown or rendered, especially with high detail. On the other hand, the bigger the first area is, the higher the probability that the user will land with his point of regard in a region rendered in the highest detail, when the rendered frame is displayed on the update cycle. Advantageously, by adapting or adjusting the size or shape of the first area dynamically, the size and or shape can be adapted in an optimal way and bringing both requirements into an optimal alignment. Especially the effect, the adjustment parameter has on the perception of the first image, can be at least in part compensated by the corresponding variation or adjustment of the adjustment parameter. E.g. if a poor system performance, long latency times or high uncertainty of the predicted point of regard would lead to a perception of the first image with low quality, e.g. due to the poor system performance, long latency times or high uncertainty the point of regard strongly deviates from the center of the first area, this can be compensated by enlarging the first area, e.g. such that even in case of a poor system performance or vague prediction of the point of regard it is still ensured that the actual point of regard at the time the first image is displayed lies within the first area.

The first adjustment parameter may be for example a parameter representing an eye tracker performance of an eye tracker for determining the point of regard or capturing the eye data, user parameters, a parameter describing the system performance of the system performing the method for displaying a stream of images according to the invention or its embodiments, or scene parameters. Parameters related to the eye tracker performance may be for example accuracy, gaze sample uncertainty, latency, refresh rate, and so on. For example the radius of the necessary circle of the first area can be calculated as a function of the following parameters: eye tracker speed, eye tracker latency, computational power, system load, available system resources, eye tracking latency, display refresh, display latency, eye tracker accuracy, saccade speed, foveal radius of the eye of the user, time since the last eye tracker sample. User parameters may be for example known eye defects, physiognomy, glasses, contact lenses, and so on. Moreover, each component of the system performing this method has performance specification. In order to compensate or adapt for those it might be very advantageous to render a larger area then required by a "perfect" system. Such system performance parameters may be for example CPU power or GPU power. Therefore, different rendering zones can be adjusted in size, preferably in an embodiment the size of the high resolution area, especially the first area can be increased such that it can be made sure that the user will always land in a region rendered in the highest detail when the rendered frame is displayed on the update cycle. Moreover, also scene parameters like scene details or complexity can be used to adapt the size and the shape of the first area.

According to another advantageous embodiment of the invention previous to displaying the first image the scene for the first image is rendered by performing several subsequent rendered steps wherein a size and/or a position of a first area is adapted in each rendered step in dependency on at least one second adjustment parameter, wherein each of the performed rendered steps is only performed with regard to the currently adapted first area.

So for example when starting the rendering of the scene for the first image the first area can be chosen large and the first render step is then performed in this large first area. During the rendering process additional information can be captured which may for example improve a predicted point of regard. This for example improves the certainty of the predicted point of regard, which again can be used for making the first area smaller so that the next rendering step only has to be performed in the smaller first area. So when rendering a scene, in each render step the first area can be made for example smaller and also be moved in its position until the certain future point of time is reached. Each render step enhances the level of detail or resolution or in general the image quality. So the first area can be rendered matching or adapting to the current predicted point of regard recursively, especially in detail, over time and during a prediction update using for example the uncertainty from the predicted gaze end point to determine the area for each recursive step considering the visual acuity, for example with a descending uncertainty increasing the resolution or rendering complexity like calculating lighting by closing in on the foveated point, which is the point of regard. For example with each rendering step and while approaching the foveated area the number of polygons is increased. The same applies for shadows or translucent areas, which usually require at least partial renderings.

According to another advantageous embodiment of the invention when predicting the point of regard for the certain future point of time an uncertainty value is determined representing the uncertainty of a matching of a position of the predicted point of regard with a position of the actual point of regard at the certain future point of time, wherein the uncertainty value is determined a several times prior to the certain future point of time, wherein the first area, especially the size of the first area, is adapted in dependency on the latest determined uncertainty value as the at least one second adjustment parameter.

Advantageously these uncertainty values can be determined during the rendering process of the rendering of the scene for the first image and the latest determined uncertainty value can be used to adapt the size of the first area for the next render step accordingly. So one can begin with a large first area, in which the scene for the first image is rendered, when the predicted point of regard is still very uncertain, and then the first area can be made smaller and smaller for each render step increasing the level of detail in each render step when the uncertainty of the predicted point of regard decreases with each gaze data update. This facilitates a very fast and precise rendering of the scene in an area which finally will match the intended area, in which the actual point of regard is finally positioned.

Alternatively or additionally the first area can also be adapted in dependency of the probability map as the at least one second adjustment parameter. So multiple possible gaze endpoints or candidates can be used and the first area is determined such to include all of the candidates. When the probability map is modified, e.g. some of the candidates are excluded based on the analysis of currently captured gaze data, then the first area can be modified. So during rendering the scene and in advance to the certain future point in time, the rendering area, namely the first area, can be modified corresponding to the one or more modification of the probability map, so that only those candidates are within the first area that have the highest probability, especially greater than a threshold. Therefore also one or more gaze endpoint candidates, especially determined on the basis of image content, can be used to, also partially, render the future image(s).

According to another advantageous embodiment of the invention when predicting the point of regard a first prediction of the point of regard for the certain future point of time is made, wherein subsequently the first prediction of the point of regard is updated, for example based on newly captured gaze data or image content, at least once prior to the certain future point of time, wherein the first area, especially the position of the first area is adapted in dependency on the latest updated prediction of the point of regard as the at least one second adjustment parameter. So not only the uncertainty of the predicted point of regard may change when approaching the certain future point of time, also the position of the predicted point of regard may change. This way this change in position can be advantageously be considered correspondingly in each render step, especially for placing the first area more and more accurately around the center of the final point of regard at the certain future point of time.

All these described embodiments are not only advantageous with regard to 2D images but especially when displaying 3D images, e.g. lightfield or stereoscopic images, to the user, as in this case the effort for rendering a scene is even higher and by gaze prediction render times can be reduced and accuracy of determining the foveated rendered region correctly can be improved.

Therefore it is an advantageous embodiment of the invention when the displayed area is a three-dimensional display area and in a) a 3D position of the point of regard is determined and in b) the first area extends in a depth direction, which is along a gaze direction of the user, and in d) the first image is displayed so that it is perceivable as a 3D image. Therefore, advantageously, foveated rendering can also be performed in three dimensions. To determine the 3D position of a point of regard depth information of the displayed image can be used and/or vergence information of the eyes of the user. So for example a gaze direction for the left and the right eye of the user can be determined and the intersection point can be calculated, constituting the 3D position of the point of regard. Also, a gaze direction of at least one eye or an average gaze direction can be calculated and intersected with the three-dimensional display area, determined, which object is intersected with the gaze direction first and the known 3D position, especially the depth information about this object can be used to determine the 3D position of a point of regard. The prediction of this point of regard can be done as already explained before. For example the z-buffer of the currently displayed frame can be used to predict the end point depth, namely the depth of the point of regard at a certain future point of time, by using the saccade direction and information about the scene. So again from captured gaze data eye parameters of at least one eye can be determined several subsequent times, like several 3D positions of the point of regard, and from these parameters, like the gaze pattern or pattern of the point of regard the characteristic eye movement, like fixation or saccade can be determined and on the basis of this the final point of regard for the certain future point of time can be predicted in 3D. The prediction again can be done on the basis of image content or context as well.

According to another advantageous embodiment of the invention, the first area and the at least one second area are three-dimensional, wherein the at least one second area follows, especially directly, the first area in and/or against the depth direction. So for example the first area can be a sphere around the predicted point of regard. Preferably, the first area or part of the image presented in the first area is rendered with highest detail and highest resolution. Part of the first image presented before or behind this first area can be presented reduced in detail, with lower resolution and so on. This again has the advantage that the latency time for rendering can be reduced by reducing the computational effort, power can be saved without negatively influencing the perception of the user, because the user could not see part of the first image lying before or behind his focus point, which is the point of regard, clearly as they are out of focus anyway.

According to another advantageous embodiment of the invention, the display area comprises a third three-dimensional area, which follows, especially directly, the first area in and or against the direction perpendicular to the depth direction, wherein the first part of the first image, which is displayed in the first area is displayed according to a first parameter value of at least one second parameter also correlated with an image characteristic, wherein the at least one second parameter is different from the first parameter, wherein a third part of the first image is displayed in the at least one third area according to a second parameter value of the at least one second parameter. Or in other words, the render criteria for rendering the scene in depth direction and perpendicular to the depth direction can be different. This is based on a finding that characteristic of the visual perception of an eye in depth direction and perpendicular to the depth direction are different. For example in the far peripheral and mid peripheral region there is no color perception. In contrast to the near peripheral and foveated region. Moreover, the motion sensitivity is higher in the peripheral regions than in the foveated region. Therefore e.g. image parts which are perpendicular to the gaze direction far away need not to be colored as the color cannot be perceived anyway. Instead in depth direction no matter on what point the user is focusing at, color can still be perceived. In contrast thereto areas around the 3D position of the point of regard are in focus and therefore can be perceived sharp, whereas areas before and behind this focus point can only be perceived unsharp.

According to the first aspect the invention also relates to a system for subsequently displaying a stream of images in a display area of a display device of the system, the system comprising:

a) an eye tracking device for determining a point of regard of a user looking at the display area;
b) a processing unit for determining a first area within the display area around the determined point of regard;
c) the display device for displaying a first image of the stream of images in the display area such that a first part of the first image, which is displayed in the first area, is displayed according to a first parameter value of at least one parameter, which is correlated with an image characteristic of the first image, and a second part of the first image, which is displayed in at least one second area outside the first area, is displayed according to a second parameter value of the at least one parameter.

Moreover, the processing unit is configured to determine the point of regard as a prediction of the point of regard for a certain future point of time, at which the first image is displayed, in dependency of at least one result of at least one image related analysis.

The advantages described with regard to the method according to the first aspect of the invention and its embodiments correspondingly apply to the system according to the first aspect of the invention. Moreover, the features and preferred embodiments described with regard to the according to the first aspect of the invention constitute further preferred embodiments of the system according to the first aspect of the invention.

According to a second aspect of the invention the method for subsequently displaying a stream of images in a display area of a display device comprises:

a) determining a point of regard of a user looking at the display area;
b) determining a first area within the display area around the determined point of regard;
c) displaying a first image of the stream of images in the display area such that a first part of the first image, which is displayed in the first area, is displayed according to a first parameter value of at least one parameter, which is correlated with an image characteristic of the first image, and a second part of the first image, which is displayed in at least one second area outside the first area, is displayed according to a second parameter value of the at least one parameter.

Moreover, the display area is a three-dimensional display area and in a) a 3D position of the point of regard is determined and in b) the first area extends in a depth direction, which is along a gaze direction of the user, and in c) the first image is displayed so that it is perceivable as a 3D image.

According to the second aspect the invention also relates to a system for subsequently displaying a stream of images in a display area of a display device of the system, the system comprising:

a) an eye tracking device for determining a point of regard of a user looking at the display area;

b) a processing unit for determining a first area within the display area around the determined point of regard;

c) the display device for displaying a first image of the stream of images in the display area such that a first part of the first image, which is displayed in the first area, is displayed according to a first parameter value of at least one parameter, which is correlated with an image characteristic of the first image, and a second part of the first image, which is displayed in at least one second area outside the first area, is displayed according to a second parameter value of the at least one parameter.

Furthermore, the display device is configured to provide the display area as a three-dimensional display area and the eye tracking device is configured to determine a 3D position of the point of regard, wherein the first area extends in a depth direction, which is along a gaze direction of the user, and the display device is configured to display the first image so that it is perceivable as a 3D image.

Advantages described with regard to preferred embodiments of the first aspect of the invention relating to 3D foveated displaying and rendering also apply for the second aspect of the invention accordingly. Moreover, the invention according to the first aspect and its embodiments can also be combined with this second aspect of the invention and constitute further embodiments of the method and system according to the second aspect of the invention.

According to a third aspect of the invention, the method for subsequently displaying a stream of images in a display area of a display device comprises:

a) determining a point of regard of a user looking at the display area;

b) determining a first area within the display area around the determined point of regard;

c) displaying a first image of the stream of images in the display area such that a first part of the first image, which is displayed in the first area, is displayed according to a first parameter value of at least one parameter, which is correlated with an image characteristic of the first image, and a second part of the first image, which is displayed in at least one second area outside the first image is displayed according to a second parameter value of the at least one parameter.

Furthermore, in b) a size and/or shape of the first area is dynamically determined in dependency on at least one adjustment parameter, which affects a perception of the first image by the user.

According to the third aspect the invention also relates to a system for subsequently displaying a stream of images in a display area of a display device of the system, the system comprising:

a) an eye tracking device for determining a point of regard of a user looking at the display area;

b) a processing unit for determining a first area within the display area around the determined point of regard;

c) the display device for displaying a first image of the stream of images in the display area such that a first part of the first image, which is displayed in the first area, is displayed according to a first parameter value of at least one parameter, which is correlated with an image characteristic of the first image, and a second part of the first image, which is displayed in at least one second area outside the first area, is displayed according to a second parameter value of the at least one parameter.

The processing unit is configured to dynamically determine a size and/or shape of the first area in dependency of at least one adjustment parameter, which affects a perception of the first image by the user.

Advantages described with regard to preferred embodiments of the first aspect of the invention, especially relating to the adaption of the first area in dependency of the first and/or second adjustment parameter correspondingly apply for the third aspect of the invention. Moreover, the invention according to the first aspect and its embodiments can also be combined with this second aspect of the invention and constitute further embodiments of the method and system according to the second aspect of the invention.

Furthermore, the preferred embodiments and features of the method and system according to the first aspect of the invention can also be combined with the method and system according to the third aspect of the invention and its embodiments and features thereof.

Therefore, all three aspects of the invention manage to enhance the probability that the final point of regard of the user will lie within the high quality first area at the time the first image is displayed. Advantageously the first aspect manages this by making a prediction of the point of regard, which probably matches the final point of regard much better than when only calculating the current point of regard. The second aspect accomplished this by reducing the necessary rendering time for 3D images by using foveated rendering also in the depth direction. Thereby, the time between the capturing of gaze data, on the basis of which the point of regard is calculated, which preferably is the time the rendering process starts, and the time between the displaying of the first image can be reduce, so that also without forecast of the point of regard the final point of regard will lie within the high quality first area with much higher probability due to this shortened latency time. The third aspect accomplishes this by dynamically adapting the first area, especially its size, so even if the point of regard has a high uncertainty or even if the latency times would be high, all these influencing factors can be compensated by corresponding adaption of the first area so that the final point of regard with much higher probability will lie within the high quality first area when the first image is displayed.

Further features of the invention and advantages thereof derive from the claims, the figures, and the description of the figures. All features and feature combinations previously mentioned in the description as well as the features and feature combinations mentioned further along in the description of the figures and/or shown solely in the figures are not only usable in the combination indicated in each place but also in different combinations or on their own. The invention is now explained in more detail with reference to individual preferred embodiments and with reference to the attached drawings.

Figure 2:
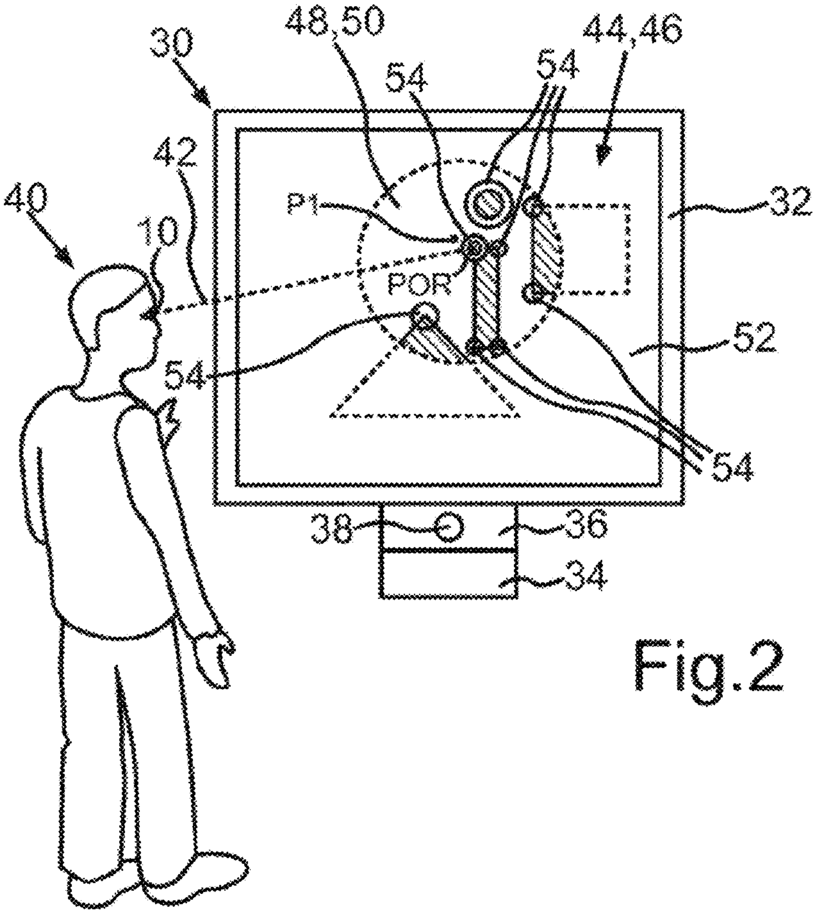
Figure 3:
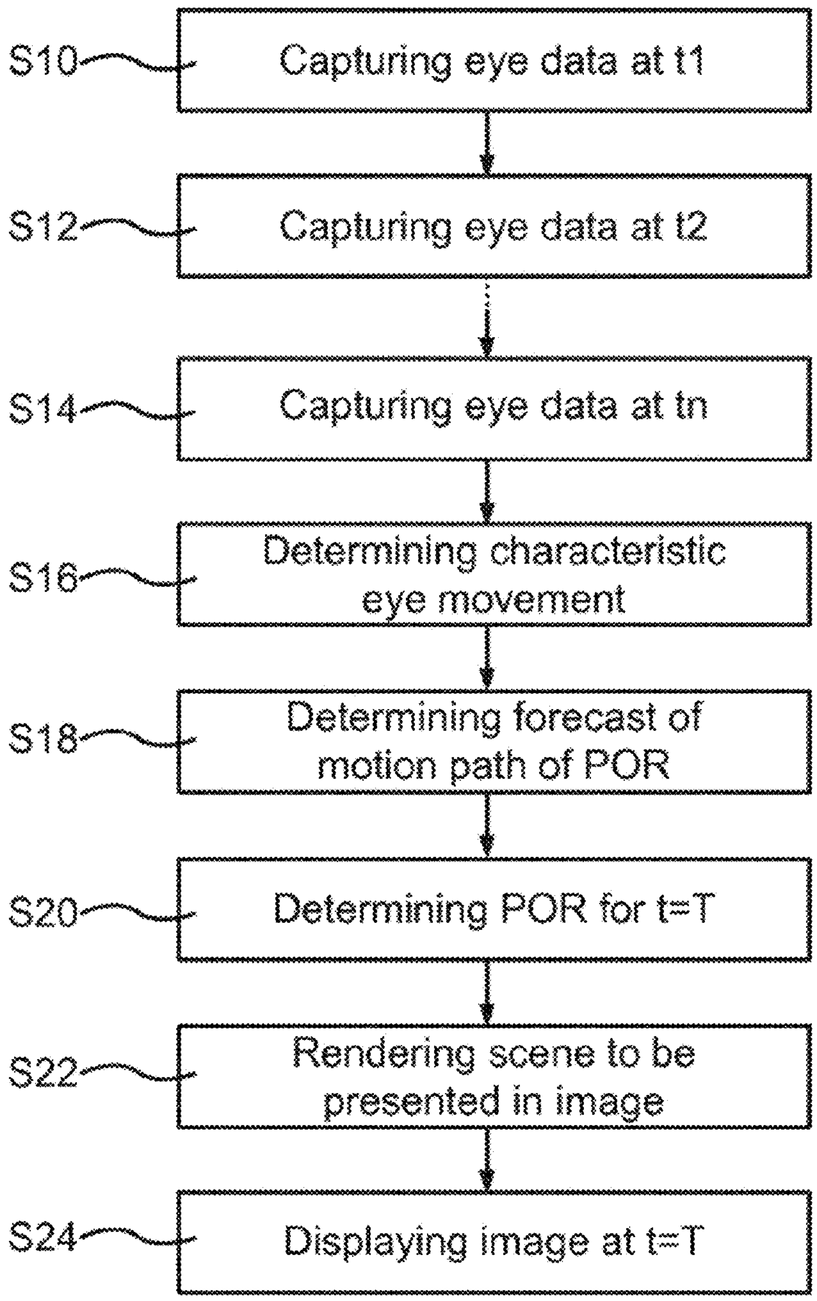
Figure 4:
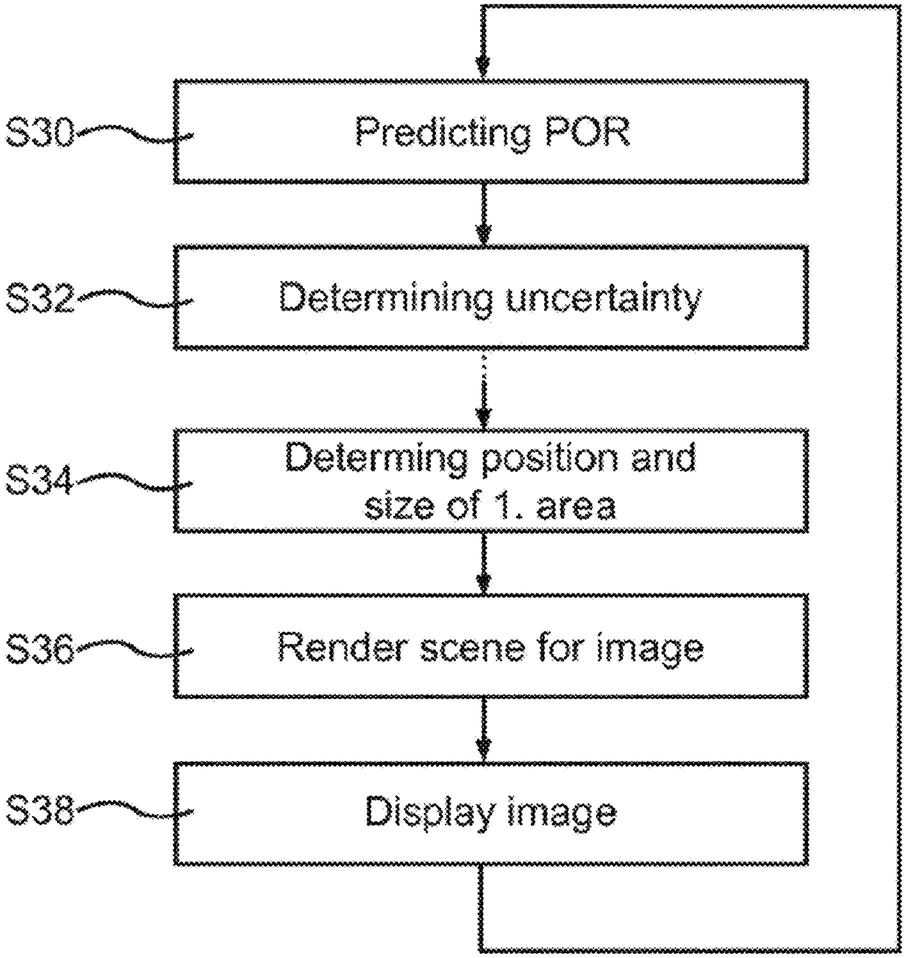
Figure 5:
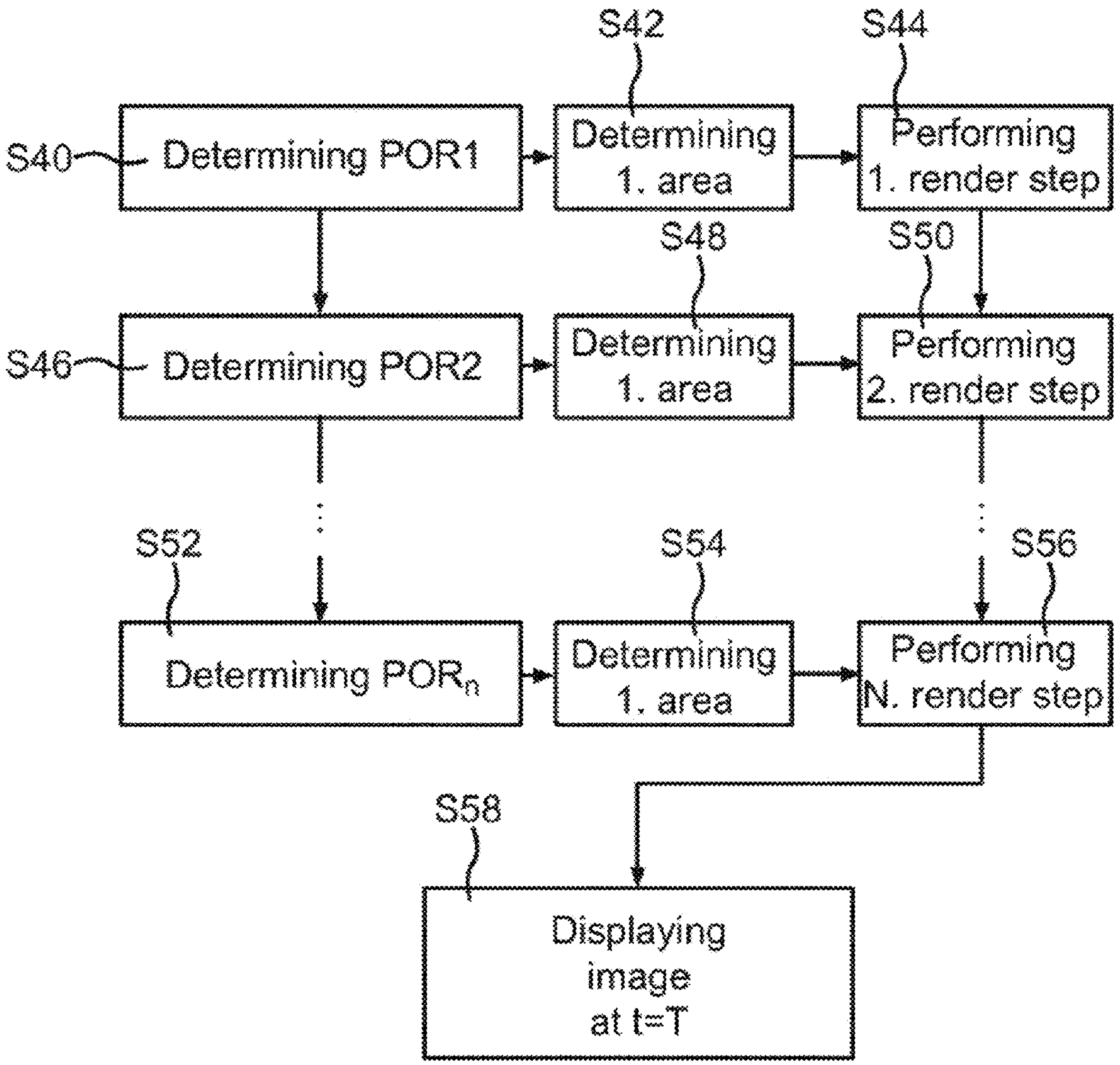
Figure 6:
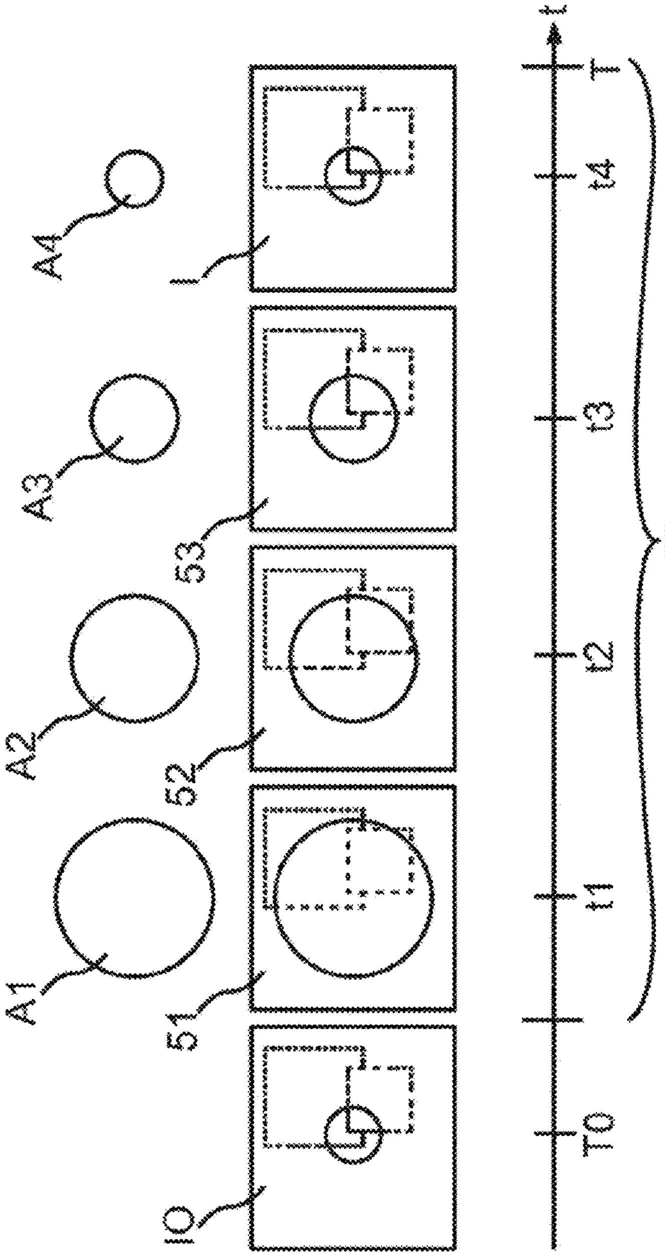
Figure 7:
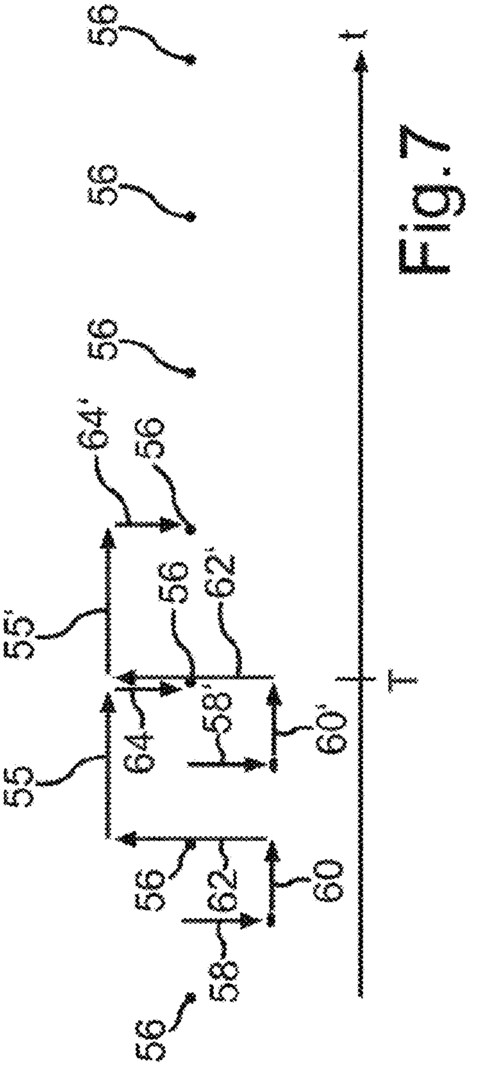
Figure 8:
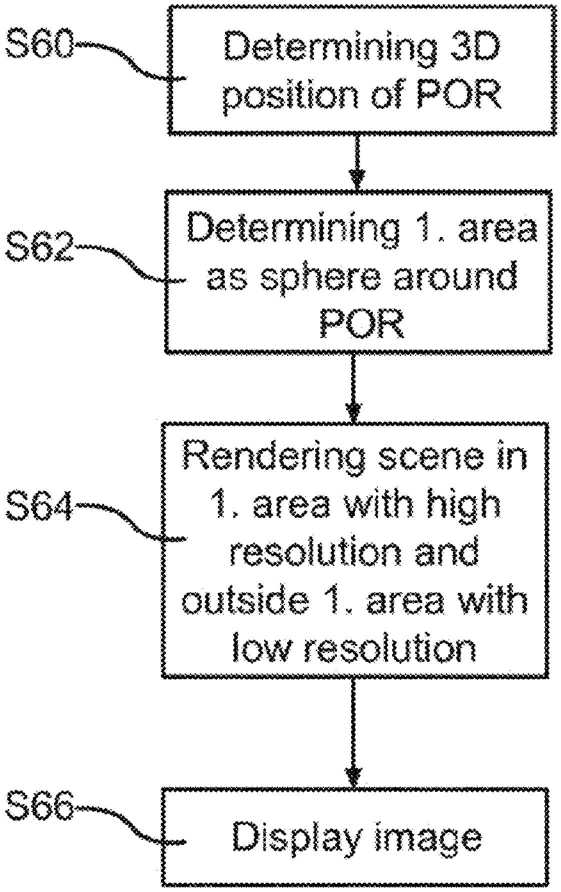
Figure 9:
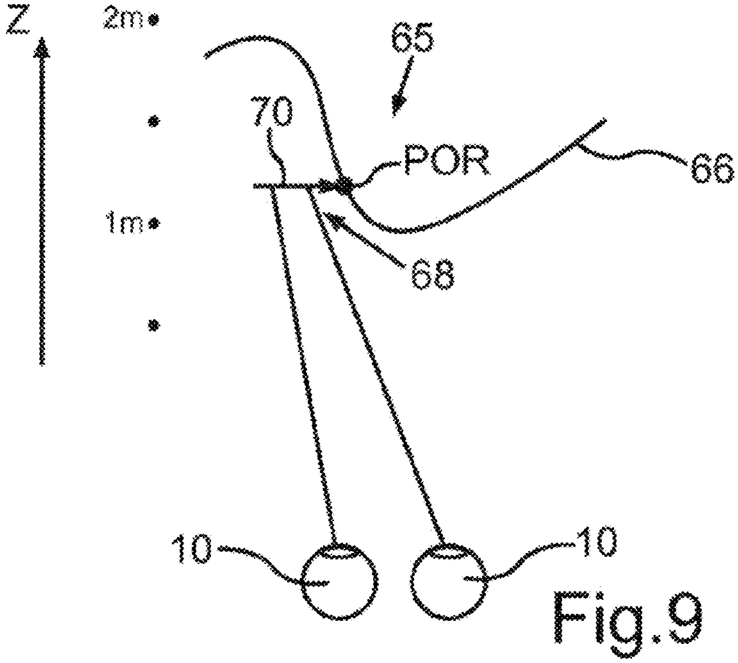

These show in:

FIG. 1 a schematic illustration of an eye for illustrating different regions of visual perception;

FIG. 2 a schematic illustration of a system for displaying a stream of images according to an embodiment of the invention;

FIG. 3 a flow chart for illustrating a method to display a stream images according to an embodiment of the invention;

FIG. 4 flow chart for illustrating a method for displaying images according to another embodiment of the invention;

FIG. 5 a flow chart for illustrating a method for displaying images according to another embodiment of the invention;

FIG. 6 a schematic illustration of the single render steps until the displaying of the final rendered image, according to another embodiment of the invention;

FIG. 7 a schematic illustration of the synchronized rendering with an eye tracker capable of display speed, according to another embodiment of the invention;

FIG. 8 flow chart for a method to display images according to another advantageous embodiment of the invention; and FIG. 9 a schematic illustration of the prediction of a 3D point of regard according to another embodiment of the invention;

FIG. 1 shows a schematic illustration of an eye 10 for illustrating different regions of visual perception. The foveated area 12 lies along the line of sight of the eye 10 and is a concentric area with a diameter of about 3 to 5 degrees with regard to the line of sight. The foveated area is the area in which the eye 10 can receive the most details and has the best color perception. The foveated area 12 is followed by the near peripheral area 14 lying concentric around the foveated area 12 and extending about 30 degrees from the line of sight. In the near peripheral area 14 still color perception is possible, however the color perception is descending in the direction of the mid-peripheral area 16, in which no color can be perceived by the eye 10 anymore. This mid-peripheral area 16 lies concentric about the line of sight from 30 to 60 degrees. The mid-peripheral area 16 is followed by the far peripheral area 18 ranging from about 60 to 110 degrees. Also in this far peripheral area no color perception is possible. The scale on the left hand sight of FIG. 1 illustrates the visual acuity VA which increases with increasing distance from the eye 10 along the line of sight. Moreover, the scale 22 shown beyond the eye 10 illustrates the motion sensitivity MS, which increases with increasing distance perpendicular to the line of sight.

The knowledge about these different regions of perception of the eye 10 now makes it possible to provide foveated rendering in very advantageous ways.

FIG. 2 shows a schematic illustration of a system 30 for displaying a stream of images according to an embodiment of the invention. The system comprises a display device 32 like a monitor or a screen, a processing unit 34, and an eye tracker 36 comprising a camera 38 for capturing images of a user 40, especially of the user's eyes 10. The eye tracker 36 can also comprise a processing unit for processing the captured images of the eye 10 of the user 40 and therefrom to determine the gaze direction 42, especially as result of an image relate analysis of the captured eye images, as well as the point of regard POR. The processing unit 34 renders a scene which is then displayed as an image 44 on the display device 32 in a display area 46. The point of regard POR determined by the eye tracker 36 is used for the processing unit 34 to determine a first area 48 circumventing the point of regard POR and preferably having the point of regard POR in the center of this area 48. Moreover, the processing unit 34 renders the scene such that a first part 50 of the resulting image 44 has a higher level of detail, a higher resolution, a higher level of brightness, and/or a higher level of color saturation and so on. Then a second part 52 of the image 44, which is displayed outside the first area 48.

As long as the user 40 is looking at the center of this first area 48, his eye 10 perceives the image 44 as normal image not noticing the decrease in color or resolution due to the fact that the second part of the image 52 lies in peripheral areas of his eyes 10 as explained before with regard to FIG. 1. If the time between the calculation of the point of regard and the refreshing of the display by showing a new subsequent image takes too long, it may happen that the point of regard POR, on the basis of which the scene for this new image was rendered, has already moved to a totally different position at the time the final image is shown. In this case the eye 10 of the user 10 may perceive the low level of details and bad resolution of parts of the shown image.

To avoid this, the eye tracker 36 determines the point of regard POR as a prediction for a certain time in the future when the image 44 shall be displayed. For this gaze prediction or prediction of the point of regard POR gaze patterns can be used on the basis of which characteristic eye movements can be classified, like fixations, smooth pursuit or saccades. On the basis of currently captured eye data the eye tracker 36 can make a forecast of the point of regard POR for this certain time in the future, wherein the processing unit 34 now uses this predicted point of regard POR for rendering the scene of the image 44 and displays the resulting image 44 at the time for which the point of regard POR was predicted.

FIG. 3 shows a flow chart for illustrating a method to display a stream images according to an embodiment of the invention. This method starts in S10 where eye data are captured at a first time t1. In S12 again eye data are captured at a second time t2. In S14 eye data are captured any time later at tn. Based on this subsequently captured eye data an eye motion pattern can be analyzed and in S16 a characteristic eye movement like a fixation or a saccade can be determined. Depending on the determined characteristic eye movement a forecast of a corresponding motion path of the point of regard POR can be determined in S18. On the basis of this forecast of the motion path the point of regard for a certain time in the future T can be determined, which is the predicted point of regard POR. Now in S22 the scene can be rendered in dependency on the predicted point of regard POR and in S24 the resulting image presenting this rendered scene is displayed at the certain time T, for which the point of regard POR was predicted.

This procedure can additionally be enhanced by not only taking into account eye data or gaze data, on the basis of which the point of regard POR is predicted, but also content of the scene of the image currently presented or of the image to be presented, especially as result of an image related analysis. For example saliency points in the scene of the image to be presented can be used. Such saliency points of the image content are also shown in FIG. 2 and denoted by 54. Saliency points are points which attract attention of the eye 10 of the user 40. Such saliency points can be for example edges of objects as shown in FIG. 2 but even other points or regions, which attract attention of the eye like color changes, bursts, motion, certain alarm colors and so on. If for example the point of regard is calculated as a prediction on the basis of captured gaze data as a first approximation for a first position P1 as shown in FIG. 2, then the processing unit 34 can additionally use the image content, especially the knowledge about the positions of the saliency points 54 and in case one of these saliency points is near the assumed first position P1 then the point of regard can be predicted as lying on the nearest saliency point instead of lying at the first position P1. Furthermore, this prediction or the prediction of the point of regard can also be done based on semantic content combining the saliency attraction with the knowledge about semantic content in the scene. Using such scene or image content of one or more of the images presented having been presented or are still going to be shown can greatly improve the accuracy of the prediction of the point of regard POR.

FIG. 4 shows another flow chart for illustrating a method for displaying images according to another embodiment of the invention, especially by means of which the foveated rendering procedure can further be enhanced. The method starts in S30 where the point of regard is predicted, which can be done as already explained. Furthermore, in S32 an uncertainty of the predicted point of regard POR is determined. This uncertainty represents the uncertainty of matching of the position of the predicted point of regard POR with a position of the actual point of regard POR at the certain future point of time. This uncertainty can for example be defined as an area, 2D or even 3D, lying around the predicted point of regard and having an extension or size such that the actual point of regard for the certain future point of time lies within that uncertainty area. Now in dependency on this determined uncertainty in S34 a position and size of the first area 48 (compare FIG. 2) is determined. Especially the position of this first area 48 is determined such that the predicted point of regard POR lies in the center of the first area 48. The size of this first area 48 is determined such that the whole uncertainty area determined in S32 is covered. After that in S36 the scene is rendered for the image to be presented, described with regard to FIG. 2, namely having higher resolution or a greater level of detail in the determined first area and a lower level of detail or less resolution outside. After that in S38 a resulting image is displayed. Now the same procedure can be repeated again for the next image to be displayed. However, when predicting the new point of regard for the new subsequent image, this prediction does not necessarily have to be done after the image is displayed in S38, but the prediction of the new point of regard also start earlier at any time between S30 and S38. By using uncertainty of a point of regard POR for adapting the first area 48 with regard to its size, it can advantageously be prevented that the actual point of regard, namely the final point of regard, at which the user is looking at the time image is displayed, does not lie within the first area 48. Besides uncertainty alternatively or additionally many more adjustment parameters for adapting or varying the first area with regard to its size or position can be provided. Such parameters can be for example latency times, refresh rates of the eye tracker, personal user parameters, like known eye defects, contact lenses, parameters of the system performance like the CPU power of the processing unit 34 or the GPU power of the processing unit 34, or also scene parameters like scene details or complexity, and many more.

FIG. 5 shows a flow chart for illustrating a method for displaying images according to another advantageous embodiment of the invention. The method starts in S40, where a first point of regard POR1 is predicted at a first time step. This first point of regard POR1 is then used for determining the first area in S42. The first area can be determined such that the first point of regard POR1 lies in the center of this area. Furthermore, as already described also an uncertainty value can be calculated for this first point of regard POR1 and also be used for determining a size of the first area in S42, e.g. the higher the uncertainty the larger the first area. After that in S44 a first render step is performed. The rendering of the scene and this first render step can be restricted to the determined first area. Alternatively the whole scene can be rendered but the scene within the first area is rendered with higher detail. Moreover in S46 a second point of regard POR2 is predicted at a second time later than the prediction of the first point of regard PORE Here again, in S48 the first area is determined in dependency on the position of the second predicted point of regard POR2 and in dependency on a calculated uncertainty for the second predicted point of regard POR2. After that a second render step in S50 is performed on the basis of the already rendered scene rendered in the first render step S44. However for performing the second render step the first area is replaced according to the new determination of the first area in S48. The rendering performed in the second render step enhances the level of detail with regard to the first render step and is restricted to this newly determined first area.

When determining the second point of regard in S46 the same gaze data can be used as already used in S40 for determining the first prediction of the point of regard POR1, however, additional gaze data captured in between S40 and S46 can be used to provide a more accurate prediction of the second point of regard POR2 with regard to the first determination of POR1. So usually, as more gaze data can be used also the uncertainty for the second point of regard POR2 will probably be smaller than that for the first point of regard PORE Correspondingly, the first area determined in S48 probably will be smaller than that determined in S42. Consequently, the performance of the second render step in S50 probably lies within the area for which the first render step was performed and being a bit smaller and, depending on whether the position of the second determined point of regard POR2 has moved with regard to the position of the first point of regard POR1 also the position of the first area may have moved slightly.

This procedure can now be repeated several times, especially as long as the certain future point of time T is not reached yet. So therefore in S52 another point of regard $POR_n$ and its corresponding uncertainty is determined, therefrom in S54 the corresponding first areas determined and on the basis of this determined first area in S56 an end render step is performed. So from time step to time step from S40 to S52 more and more gaze data can be used to refine the prediction for the point of regard, which will probably improve accuracy and therefore decrease the uncertainty. Correspondingly, from step to step, especially from S42 to S54 the first area will get smaller and when performing the render steps from S44 to S56 the rendering will be restricted to an area getting smaller and smaller and from step to step improved in detail, so that in the end, especially at the certain future point of time T, the foveal area around the actual point of regard is rendered with the highest detail and the center of this area matches the real point of regard of the user very accurately. Finally, in S58 corresponding resulting image is displayed at the certain time T. This procedure is again visualized in FIG. 6.

FIG. 6 shows a schematic illustration of the single render steps until the displaying of the final rendered image. The display is updated or refreshed at a certain display rate. So preferably in regular time steps a newly rendered image is displayed. The first image I0 shown in FIG. 6 at the time TO is the rendered and displayed image of the render cycle before. After this image I0 is displayed a new render cycle 55 starts. So when the new render cycle 55 starts at a first time step t1 the scene for the image I to be displayed finally at the certain future point of time T is rendered in a first render step. As already described for this purpose a first area is determined, on the one hand in dependency on a first predicted point of regard POR1 and for this first predicted point of regard POR1 the uncertainty is calculated and used for determining the size of this first area. The corresponding first area A1 for the scene image S1 rendered in this first time step t1 is illustrated above the corresponding scene image S1. As the point of regard is predicted a relatively long time in advance of the certain future point of time T also the uncertainty of this predicted point of regard is high and therefore this first area A1 is comparatively high. The first render step performed in this first time step t1 then is restricted to this determined first area A1. This procedure is then repeated in a second time step t2. However, as now the gaze data already can be used for predicting a newly calculated point of regard, also the uncertainty for this prediction gets smaller and correspondingly the size of the first area A2 corresponding to the second time step t2. Now a second render step is performed in the second time step t2, which again is restricted to the determined first area A2 and enhances the level of detail in this first area with regard to the previously rendered scene image S1. This again is done once more in a third time step t3, where again the predicted point of regard is updated by new captured gaze data, therefore again the uncertainty of this prediction is reduced once more, the corresponding calculated size of the first area A3 is getting smaller again, and then correspondingly a third scene image S3 is rendered in the third time step t3 according to a third render step, which again is restricted to this newly calculated first area A3 and therefore enhances quality and level of detail within this area. As described, this procedure then is repeated in the final time step t4, again for a newly calculated first area A4, which is again smaller than the previously calculated first areas A1, A2, A3. And again a corresponding fourth render step is performed which leads to the final image I, which is then presented or displayed at the certain time T. The scene images S1, S2, S3 are only shown for illustrative purposes in FIG. 6 but those images are not displayed on the display device, only the final image I at the end of the render cycle 55.

So for example the gaze end point is predicted preferably using the information from an event detection and measurements of the saccade onset. As at the beginning the uncertainty area for the predicted gaze end point is large, a first iteration of the scene using a large area, possibly also the whole field of view, is performed. As it is proceeded with refining the scene, the uncertainty of the gaze end point prediction is decreasing and therefore the area to be refined is made smaller than in the step before. Ideally, the rendering area is getting smaller as the certainty for the end point increases for every e.g. recursive rendering step or for the calculation of lighting and so on. By the time the display is ready to display a new frame the area where the user gazes at has the highest quality.

Moreover, the prediction of the point of regard, or also called gaze endpoint, can be predicted additionally using image content, either of the images already presented to the user, currently presented to the user or also of images to be presented to the user. With regard to this contend aware prediction and rendering by performing an online event detection, i.e. the detection of a characteristic eye movement like a saccade, the system preferably knows or determines the saccade direction, combining this e.g. with saliency information from the scene gives certain candidates of possible gaze endpoints. A set of possible candidates may also come by analyzing fixation patterns of other users (or the same). The gaze endpoint candidates can already be used in the rendering process, e.g. in combination with the recursive rendering process explained above. Over time the set of possible endpoints can be reduced along with the availability of a more refined gaze.

Moreover, the eye tracker 36 (compare FIG. 2) and the rendering, e.g. performed by the processing unit 34 (compare FIG. 2), can be synchronized in a way that one has a new eye tracking frame at the beginning of a new rendering cycle 55, and which is now explained in more detail with regard to FIG. 7.

FIG. 7 shows a schematic illustration of the synchronized rendering with an eye tracker capable of display speed. The shown points 56 illustrate the time of the display update with regard to the illustrated time line t. For the sake of simplicity in this example it is assumed that a new render cycle 55 starts at a point 56 at which the display is updated, namely the display time of the frame. Here the arrow 58 illustrates the determination of an actual point of regard by the eye tracker. From this current point of regard and preferably also considering previous determined point of regard or other gaze data, the eye tracker calculates a prediction for the point of regard for a certain future point of time at which the image, which is rendered using this predicted point of regard, is displayed. The certain point of time is here again denoted with T. The arrow 60 illustrates the eye tracker latency. After that the predicted point of regard is passed to the processing unit, which is illustrated by the arrow 62, which then starts the render cycle 55 using this predicted point of regard. After the render cycle 55 is finished the rendered image is displayed, which is illustrated by error 64. This procedure is periodically repeated, which is illustrated by the arrows 58', 60', 62', 55', 64', wherein the corresponding actions are performed as described with regard to the arrow 58, 60, 62, 55, 64.

The render cycles 55, 55' may also overlap and may be performed partially in parallel. The rendering system, like the processing unit, can also synchronously trigger an update of the gaze sample or prediction of such. In one embodiment it is preferable to simulate trigger mode: In case of a high frame rate eye tracker the frames can be simply buffered and they are only started to be processed once the display is almost ready to ask for the next predicted point of regard.

FIG. 8 shows flow chart for a method to display images according to another advantageous embodiment of the invention. In S60 a 3D position of the point of regard is determined, in S62 the first area is determined in dependency of the 3D position of the point of regard, especially as a sphere around the point of regard with a point of regard as center of the sphere. After that in S64 the scene is rendered such that the part of the scene within the first area is rendered with high resolution or a high level of detail and the scene outside the first area is rendered with low resolution or low level of detail or not at all. Finally, in S66 the resulting image is displayed, especially as a 3D image, or such that it is at least perceivable as a 3D image.

According to this advantageous embodiment it is possible to provide foveated rendering, not only in two dimensions but also in three dimensions. Here also the special physiognomy of the eye 10 as explained with regard to FIG. 1 can be taken into account to advantageously reduce computing time and render time and save power and reduce latency times. Moreover, all embodiments explained before with regard to the gaze prediction, the adaption of the first area, and others can similarly be applied to this three-dimensional use case.

FIG. 9 shows a schematic illustration of the prediction of a 3D point of regard POR. Especially, FIG. 9 shows top view onto the eye 10 of a user looking at a 3D image or 3D scene 65, having 3D objects, including a surface 66. On the basis of initially captured gaze data like the initially determined gaze direction 68, especially also taking into account previously gaze data, and in case of a detected saccade of the eyes the saccade direction 70 can be determined. This saccade direction 70 is illustrated by an arrow. From this it can be determined that the final end point, which is the final gaze point or point of regard POR, which lies in that direction. Moreover, to predict this final point of regard POR knowledge about the 3D scene 65 can be used. So for example the calculated motion path of the points of regard along the saccade direction 70 can be intersected with a surface 66 of scene objects. This intersection point can then constitute the predicted point of regard. 3D position of this point of regard can be determined using the z-buffer describing the depth coordinates of objects in the scene 65 as illustrated by the corresponding z-axis in FIG. 9. Thereby the 3D point of regard POR can be determined. Alternative also eye data such as measuring the accommodation of at least one eye can be used by possibly also taking visual aids of a user into account. By using the z-buffer of the currently displayed frame the end point depth can be predicted by using the saccade direction and information about the scene 65.

According to further advantageous embodiments of the invention rendering can be simplified reduced in complexion knowing the depth the user will look at next by reducing the periphery of the user in more dimensions than just resolution, preferably by:

- Skipping parts of the rendering process (or cutting short) descending outwards from the fovea, e.g. deactivating or skip application of certain shaders to reduce complexity, affecting preferably at least one of: vertex shader, tessellation shader, geometry shader, pixel (fragment) shader, z-test;
- Applying extra shades to actively simplify, preferably flatten, the scene in the periphery by using e.g. vertex shader to change shape of objects, geometry shader (add/remove objects);
- E.g. to simplify lighting computation, prevent waves to be created on water;
- Decreasing effects like physical animation e.g. for showing realistic water, rivers as well as details of shadows; also information from the frame before can be reused;
- Not rendering/considering partial occlusions or 'see through' objects, e.g. use stencil buffer to block objects being rendered behind other objects);
- Alter the rendering direction along the z-axes to match if the users looks near or far;
- Using (only) w-buffering, leading to less artifacts for far objects-due to equal detail distribution between far and near, if the user looks at 'far', middle, i.e. farer than a predefined distance;
- Moving the clipping plane according to or in dependency of the users gaze depth;
- To cover less volume;
- E.g. Move near clipping plane closer to camera if user looks 'close', i.e. closer than a predefined distance, to increase detail in the front and reduce in the back;
- Prevent z-fighting in the periphery to suppress unwanted flickering.

Moreover it is very advantageous to reduce peripheral complexity in the images. Movements in the peripheral view of a person can trigger an attention shift depending on the semantic of the scene which can be voluntary or involuntary; both effects can be controlled/enhanced by the knowledge of the user's point of gaze, i.e. point of regard. Involuntary movements are caused by rendering artifacts such as aliasing or z-fighting. Further, the visual intake in the peripheral field of view is different than in the foveated region, this fact can be exploited by reducing the scene not only in resolution but also in other "dimensions" such as texture, color (color-perception stops at roughly 30 deg), brightness, etc.

Also entities in the scene, which are currently hidden from the user, can be rendered in dependency of a user action, especially also a predicted user action. User action can be predicted by the following: Attention shifts towards visual attractive alteration of one or more scene elements, like appearance, blinking, shape shift, motion, etc. If an object in the user's field of view starts blinking, the system can predict that the user is likely to switch his attention to it, and on the basis of this to perform gaze prediction. Therefore the system can render this object already with a high resolution while preferably still rendering the user's current gazed on a different area in a high resolution. Also other user actions can reveal hidden entities: When the user looks at a door which is leading into a next room, the rendering of this room can be started in a low priority parallel thread. If user continues to look the rendering is continued in more detail and/or with higher priority. For this step also statistical and history data of at least one preferably other user can be taken into account. E.g. when 90% of the users after looking at a door enter a room it is very likely that this will happen again.

Also the detection of a vestibule-ocular reflex (VOR) can be taken into consideration to simplify the rendering process. If a VOR is detected the retendering of the scene might not be (completely) necessary since the foveated (high detail region) has not changed. Therefore, the scene can be warped to compensate for head movement, or also only to compensate for an orientation change, and to either simply fill and/or mirror the resulting gaps if any in the periphery by:

- Repeating and/or mirroring;
- Retendering the periphery, e.g. in low resolution; color/texture fill;
- etc.

Such a VOR can be detected by e.g. detecting head movement, e.g. by means of a head tracker, and at the same time detecting a fixation or smooth pursuit movement of the eye. If a fixation of the eye is detected than it can be assumed that this fixation last for a specific time typical for a fixation. If during such a fixation head movement is detected, than only correction for a change in perspective or a rotation about the line of sight has to be performed, which can be done in a simple way by above named features.

Therefore, the invention and its embodiments provide many advantageous possibilities to enhance foveated displaying of images, especially also to enhance and simplify the rendering process and to shorten latency times.

LIST OF REFERENCE SIGNS

10 eye
12 foveated area
14 near peripheral area
16 mid peripheral area
18 far peripheral area
20 scale
22 scale
30 system
32 display device
34 processing unit
36 eye tracker
38 camera

40 user
42 gaze direction
44 image
46 display area
48 first area
50 first part of image
52 second part of image
54 saliency point
55' render cycle
56 display refreshing
58, 58' gaze data capturing
60' latency time
62, 62' passing to processing unit
64, 64' displaying image
65 3D scene
66 surface
68 initially determined gaze direction
70 saccade direction
VA visual acuity
MS motion sensitivity
POR, POR1, POR2, PORE point of regard
t, t1, t2, t4, to times
T certain future point in time
I0, I displayed image
S1, S2, S3 rendered scene image
A1, A2, A3, A4 first area

What is claimed is:

1. A method comprising:
determining a display time for an image;
determining gaze data of an eye of a user at a plurality of times prior to the display time;
predicting, at a prediction time prior to the display time and after the display time is determined, a point of regard of a user at the display time based on the gaze data;
rendering, at a rendering time prior to the display time and after the display time is determined, an image such that a first part of the image in a first area around the point of regard is rendered according to a first parameter value of an image quality parameter and a second part of the image in at least one second area outside the first area is rendered according to a second parameter value of the image quality parameter; and
displaying, at the display time, the image.

2. The method of claim 1, further comprising determining an adjustment parameter, wherein rendering the image includes rendering the image such that a size and/or shape of the first area is based on the adjustment parameter.

3. The method of claim 2, wherein determining the adjustment parameter is based on an identity of the user.

4. The method of claim 3, wherein determining the adjustment parameter is based on visual parameter associated with the identity of the user.

5. The method of claim 2, wherein determining the adjustment parameter is based on a performance of an eye tracker that generates the gaze data.

6. The method of claim 5, wherein determining the adjustment parameter is based on a gaze sample uncertainty of the eye tracker.

7. The method of claim 2, wherein determining the adjustment parameter is based on a performance of a renderer that renders the image.

8. The method of claim 7, wherein determining the adjustment parameter is based on a computational power of the renderer.

9. The method of claim 7, wherein determining the adjustment parameter is based on a latency of the renderer.

10. The method of claim 1, wherein predicting the point of regard is further based on gaze data of at least one second user who has looked at the image before.

11. The method of claim 1, wherein predicting the point of regard is further based on one or more user actions.

12. The method of claim 11, wherein the one or more user actions occur before the prediction time.

13. The method of claim 11, further comprising predicting the one or more user actions occurring after the prediction time.

14. A device comprising:
a processor to:
determine a display time for an image;
determine gaze data of an eye of a user at a plurality of times prior to the display time;
predict, at a prediction time prior to the display time and after the display time is determined, a point of regard of a user at the display time based on the gaze data; and
render, at a rendering time prior to the display time and after the display time is determined, an image such that a first part of the image in a first area around the point of regard is rendered according to a first parameter value of an image quality parameter and a second part of the image in at least one second area outside the first area is rendered according to a second parameter value of the image quality parameter; and
a display to display, at the display time, the image.

15. The device of claim 14, wherein the processor is further to determine an adjustment parameter and render the image such that a size and/or shape of the first area is based on the adjustment parameter.

16. The device of claim 15, wherein the processor is to determine the adjustment parameter based on an identity of the user.

17. The device of claim 15, wherein the processor is to determine the adjustment parameter based on a performance of an eye tracker that generates the gaze data.

18. The device of claim 15, wherein the processor is to determine the adjustment parameter based on a performance of a renderer that renders the image.

19. The device of claim 14, wherein the processor is to predict the point of regard further based on gaze data of at least one second user who has looked at the image before.

20. A non-transitory computer-readable medium encoding instructions which, when executed, cause a processor to perform operations comprising:
determining a display time for an image;
determining gaze data of an eye of a user at a plurality of times prior to the display time;
predicting, at a prediction time prior to the display time and after the display time is determined, a point of regard of a user at the display time based on the gaze data;
rendering, at a rendering time prior to the display time and after the display time is determined, an image such that a first part of the image in a first area around the point of regard is rendered according to a first parameter value of an image quality parameter and a second part of the image in at least one second area outside the first area is rendered according to a second parameter value of the image quality parameter; and
displaying, at the display time, the image.

* * * * *